United States Patent [19]
De Vries et al.

[11] 3,766,511

[45] Oct. 16, 1973

[54] THERMISTORS

[75] Inventors: Robert C. De Vries, Burnt Hills; James F. Fleischer, Scotia, both of N.Y.

[73] Assignee: General Electric Company, Schenectady, N.Y.

[22] Filed: Dec. 26, 1972

[21] Appl. No.: 318,364

Related U.S. Application Data

[62] Division of Ser. No. 155,949, June 23, 1971.

[52] U.S. Cl. .................................. 338/22, 252/518
[51] Int. Cl. ........................................... H01c 7/04
[58] Field of Search ....338/22–25; 252/518; 29/612

[56] References Cited
UNITED STATES PATENTS 2,700,720  1/1955  Torok .............................. 29/612 X
3,231,522  1/1966  Blodgett et al. ................ 252/521 X Primary Examiner—C. L. Albritton
Attorney—Gerhard K. Adam

[57] ABSTRACT

Thermistors are provided in which the thermally sensitive semiconducting material has the formula:

$$PbO \cdot PbZO_4,$$

wherein Z is a member selected from the group consisting of chromium, molybdenum, tungsten, and sulfur or mixtures thereof. The thermistor device can be made by dipping two closely spaced electrical conductors into a melt of the thermally sensitive semiconducting material to form an element of the material between the conductors.

8 Claims, 1 Drawing Figure

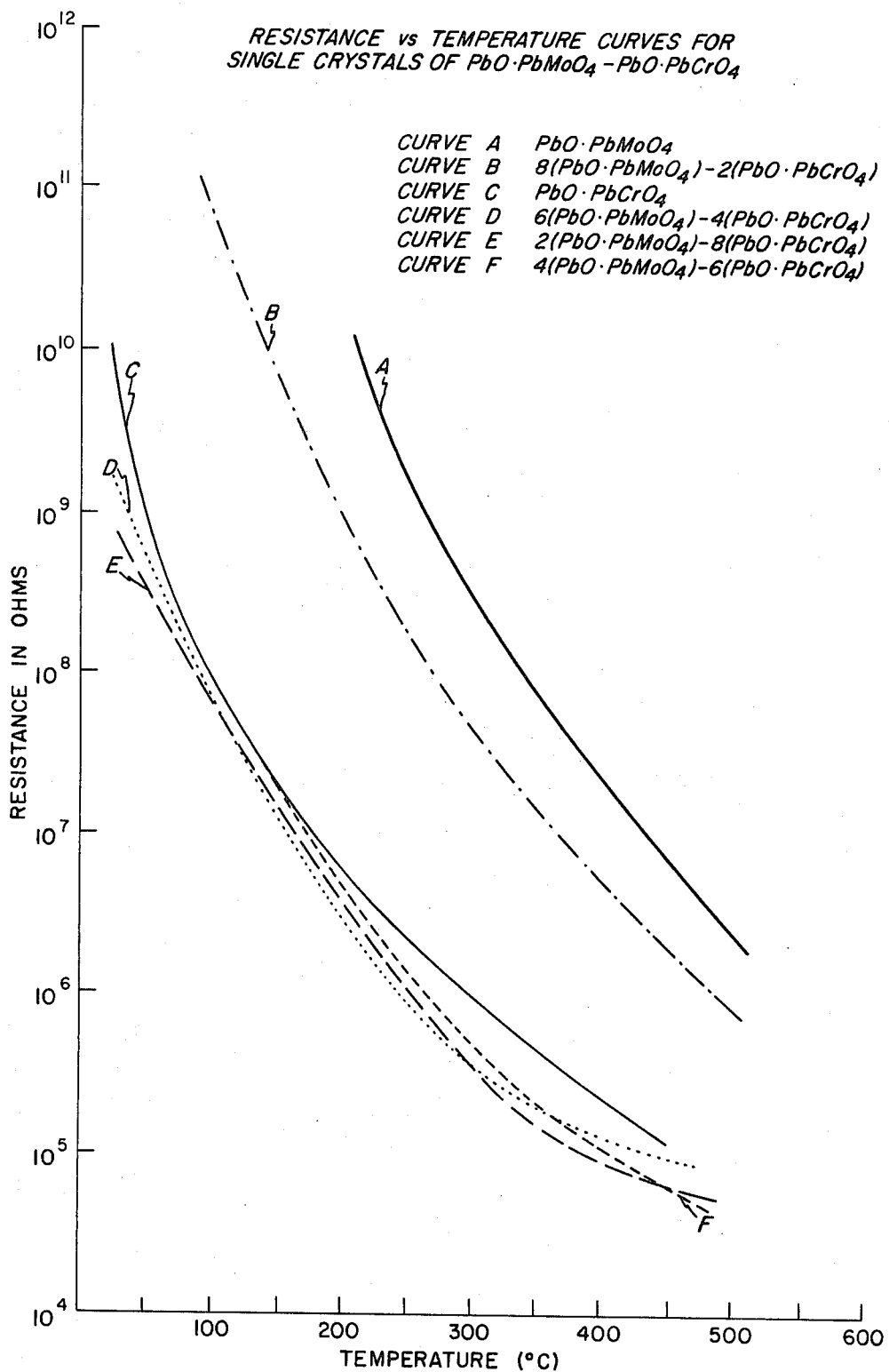

THERMISTORS

This is a division, of application Ser. No. 155,949, filed June 23, 1971.

THERMISTORS

Thermistors are semiconducting devices having electrical conductivities between those of conductors and insulators. The term "thermistors" is derived from thermally sensitive resistors, since the resistance of a thermistor varies rapidly with temperature. In recent years temperature measurements with semiconducting, thermally sensitive resistors have become increasingly widespread. A discussion of such devices is given by E.C. Robertson et al., *Properties of Thermistors Used in Geothermal Investigations* and by R. Rasbet et al., *Preparation of Thermistor Cables Used in Geothermal Investigations*, Geological Survey Bulletin 1203-B,C, U.S. Government Printing Office, Washington (1966).

The advantages of thermistors over resistance thermometers and the thermocouple is described by C.R. Droms, *Thermistors for Temperature Measurements*, in Am. Inst. Physics, *Temperature, Its Measurement and Control in Science and Industry*, New York, Reinhold, V.3, part 1, pages 339–346. The semiconducting materials used in the latter report were the oxides of nickel, manganese, and cobalt.

Lead pigments such as red lead, basic lead sulfate and basic lead chromate are among the traditional raw materials of the paint industry. These ingredients have been used particularly in anticorrosive primer formulations for the protection of steelwork. The lead pigments are discussed in some detail under *Pigments (Inorganic)*, Encyclopedia of Chemical Technology, 2nd Edition, Vol. 15, pages 495–555 (1968).

Quite surprisingly, we have discovered that certain classes of lead pigments have semiconducting properties. Furthermore, the resistance of these materials varies rapidly with changes in temperature. Thus, we have discovered a new use for a class of lead compounds in the manufacture of thermistor devices.

In accordance with the present invention, we have discovered a thermistor device comprising electrical current leads and a thermally sensitive semiconductor material having the formula:

$$PbO \cdot PbZO_4,$$ 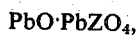

wherein Z is a member selected from the group consisting of chromium, molybdenum, tungsten, sulfur and mixtures thereof. The thermistor device can be made in any conventional shape, but for rapid responses it is usually made as small beads, disks or rods. When used as temperature sensing devices, the novel thermistors have a negative coefficient of resistance and can be made from both polycrystalline materials and from single crystals.

The thermally sensitive semiconductor element is broadly made from a single compound or mixture of compounds which includes the following:

$PbO \cdot PbCrO_4$, 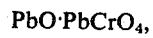

$PbO \cdot PbMoO_4$, 

$PbO \cdot PbWO_4$, 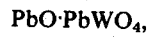

$PbO \cdot PbSO_4$, 

Although the molybdenum, tungsten and sulfur analogs of $PbO \cdot PbCrO_4$ show a decrease in resistivity with increasing temperature, their room temperature resistance is two to three orders of magnitude higher than the chromate. Thus the analogs per se are less desirable as thermistors, but in mixtures they can be used to increase the electrical resistance of $PbO \cdot PbCrO_4$.

The preferred compound is basic lead chromate ($PbO \cdot PbCrO_4$) which is a congruently melting compound in the $PbO-PbCrO_4$ system. Some of its optical properties are well known since the material is an orange-red pigment which darkens on heating. This color change is reversible. The congruent melting behavior of basic lead chromate is advantageous for single crystal growth from the melt and for solidification of the material as beads onto metal wires or strips. This technique appears to be a convenient way of making the temperature sensors. Other methods include hot pressing, swaging composites and forming single crystals.

Since basic lead chromate melts at a temperature of about 928°C. in air and is easily contained in platinum crucibles without attack of the platinum, one can solidify a polycrystalline bead onto wires by rapid withdrawal of the wires from the melt. Casting into molds is another way of making the beads. Units of varying bead sizes from about 0.5 to 3 mm. can be made by the wire-dipping technique. Bead size can be increased by repeated immersion of the bead. Silver, gold and platinum are useful as lead wires for the solidified beads.

Single crystals of basic lead chromate can be pulled from the melt with relative ease. The details of the chemistry of systems with extensive solid solution and of the crystal growth process have been reported by R.C. DeVries, et. al., *Phase Equilibria and Crystal Growth in the Systems $PbO \cdot PbCrO_4—PbO \cdot PbMoO_4$, $PbO \cdot PbCrO_4—PbO \cdot PbWO_4$ and $PbO \cdot PbCrO_4—PbO \cdot PbSO_4$*, Mat. Res. Bull., Vol. 5, pages 87–100 (1970). The important result is, that not only can single crystals of basic lead chromate be grown, but extensive solid solutions in which molybdenum, tungsten and sulfur are substituted for chromium can also be made. In preparing speciment for electrical measurements, units were made from roughly rectangular pieces of single crystals cleaved with two opposite sides parallel, the thickness between parallel cleavage surfaces of different crystals ranging from 0.5 mm. to 1.0 mm. and each surface to which electrical contact was made was about 4–9 mm².

In making the novel thermistors of the present invention, various methods can be used for making 2-point electrical contacts. These include, for example, (1) simple pressure contact with gold foil against as-cleaved surfaces of the crystal; (2) simple pressure contact of gold foil against a vapor deposited gold or silver coating on cleaved crystal surface; (3) leads attached to gold or silver coatings by means of silver paste bonding material; and (4) soldering of gold or silver leads to crystals by means of gold-germanium alloy preforms.

The reason why the basic lead chromates are better electronic conductors than the analogs listed above is not completely understood, but the problem is probably best approached by the explanation given by T.W. Lashof, *Electrical Conductivity of Lead Chromate*, J. Chem. Phys., 11, pages 196–202 (1943). This material is an electron-excess conductor, and Lashof postulated a supply of electrons within $PbCrO_4$ by means of a thermally activated dissociation reaction for a small number of chromate molecules. This dissociation is dependent upon the ability of the $Pb^{2+}$ ions to be reduced to neutral Pb atoms at the same time that the $Cr^{6+}$ ion is being reduced to $Cr^{3+}$. The accompanying oxidation of $O^{2-}$ to $O_2$ provides the electrons for the reduction reactions. Lashof explained that some of the Pb atoms thus formed would then be ionized to provide free electrons to account for the conductivity.

The suggested mechanism for electronic conductivity in $PbCrO_4$ requires that some of the $6^+$ ions change to lower valence states. Because of the ease with which $Cr^{6+}$ can do this compared to the other ions, $Mo^{6+}$, $W^{6+}$, and $S^{6+}$, we expect greater conductivity in the basic lead chromate than in the analogs. This has proved to be the case.

The accompanying FIGURE illustrates the semiconducting properties of single compounds and mixtures of compounds prepared in accordance with the present invention.

Referring to the drawing, the resistances in ohms of the semiconducting materials made from roughly rectangular crystals cleaved with two opposite sides parallel and having a thickness of 0.5–1.0 mm. are shown at various temperatures for single compounds: Curve A — $PbO \cdot PbMoO_4$ and Curve C — $PbO \cdot PbCrO_4$; and for mixtures of these compounds: Curves B, D, E and F. These curves indicate that the novel thermistors have a negative coefficient of resistance and that the resistivity of the $PbO \cdot PbCrO_4$ compound is substantially lower than the $PbO \cdot PbMoO_4$ compound. With regard to the mixtures, the addition of $PbO \cdot PbCrO_4$ reduces the resistivity of the $PbO \cdot PbMoO_4$ (see Curve B) until a point is reached at which the mixture of $PbO \cdot PbMoO_4$—$PbO \cdot PbCrO_4$ (Curves D, E and F) results in producing curves which are substantially similar to the pure $PbO \cdot PbCrO_4$ (Curve C).

As is well known in the art of making thermistors, the semiconducting element of the present invention can be encapsulated in conventional protective materials, such as polymeric materials, glasses and ceramics.

Our invention is further illustrated by the following examples.

EXAMPLE I

A $PbO \cdot PbCrO_4$ thermistor was made by the following technique. Powders of 22.32 grams of reagent grade PbO and 32.32 grams of reagent grade $PbCrO_4$ were mixed and then melted together in a platinum crucible at about 1,000°C. Two gold wires about 0.5 mm. thick and 5 cm. long and spaced about 1.0 mm. apart, were immersed into the melt to a depth of 2–3 mm. Upon withdrawal of the wires from the melt, a droplet which was cooled to a solid bead adhered to the closely spaced wires.

The resistance of the bead and wire unit was then measured as a function of temperature. This was accomplished by attaching the unit to two wires which were threaded into a four-hole ceramic thermocouple protection tube. The other two holes in the tube held a thermocouple which could be fixed in a position within 1–2 mm. of the bead unit. This entire unit was lowered into a tube furnace of the resistance heating type in which the temperature could be controlled to ± 2°C. The wires supporting the bead unit were attached to a vacuum tube voltmeter or a resistance bridge or a megohm bridge. The vacuum tube voltmeter was standardized before each reading against known resistances. Resistance readings were taken at a series of temperatures determined from the thermocouple. Final readings were taken after the furnace temperature had equilibrated at the desired temperature. The room temperature resistance of a bead unit was $>10^9$, but at 550°C. the resistance had dropped to about $10^4$ ohms and to nearly $10^2$ ohms at 850°C.

EXAMPLE II

A. A single crystal of $PbO \cdot PbCrO_4$, grown by pulling from the melt, was cleaved into thin slices in the thickness range 0.5 to 1.0 mm. and small rectangular pieces of about 1–2 $mm^2$ were mechanically clamped between two pieces of 0.001 inch gold foil which served as electrodes. Upon application of heat to the crystal, a marked decrease in resistance from a room temperature value of about $10^{10}$ ohms was noted in each case and the effect was reversible and reproducible upon cooling and heating, respectively.

When the sample was placed in a furnace with a thermocouple and resistance measurements taken at different temperature, a curve of the type shown in Curve C of the drawing was obtained. It was found that an aging treating of about 15 hours in the range 500°–550°C. was effective in increasing the reproducibility of the results. Because of their intrinsic homogeneity and greater perfection compared to the polycrystalline beads, the single crystal thermistor units are more stable than the solidified beads.

B. A single crystal of $PbO \cdot PbCrO_4$ was coated with a vapor deposited film of chromium metal overlaid by vapor deposited gold in order to provide an electrical contact. Measurements of resistance versus temperature after attaching conducting lead wires to the vapor deposited metal layers showed the same negative temperature coefficient behavior previously described.

C. Gold electrodes were attached to a single crystal of $PbO \cdot PbCrO_4$ by a soldering method using a 93 Au–7Ge (wt.%) alloy preform as the solder between electrode and crystal. The electrodes, preform and crystal were stacked in the proper sequence vertically on a support rod and clamped together in a furnace. Heating to 700°C. for a few minutes resulted in good electrical contacts. When the resistance of this type of unit was measured as a function of temperature, the same negative temperature coefficient behavior found for mechanical contacts on single crystals and for polycrystalline beads on wires was observed.

EXAMPLE III

A powder of $PbO \cdot PbCrO_4$ composition was sintered by hot pressing at 60 kilobars and 1,020°C. Electrodes were pressed on the ends of the cylindrical sample during the sintering process. The sample was 2.5 mm. high and 3.5 mm. in diameter. This unit was connected to a vacuum tube voltmeter resistance measuring circuit, and it was demonstrated that the material in this sintered form behaved as a thermistor with a negative temperature coefficient upon heating.

EXAMPLE IV $PbO \cdot PbMoO_4$ was mixed in varying proportions with $PbO \cdot PbCrO_4$ and thermistors made from single crystal elements were made as described in Example IIA. The compositions of the mixtures in mole percent is set forth in the table below.

| Composition | $PbO \cdot PbCrO_4$ % | $PbO \cdot PbMoO_4$ % |
|---|---|---|
| A | 0 | 100 |

| | | |
|---|---|---|
| B | 20 | 80 |
| C | 0 | 100 |
| D | 40 | 60 |
| E | 80 | 20 |
| F | 40 | 60 |

The resistance versus temperature data are shown in the curves of the drawing.

EXAMPLE V

The ends of two noble metal wires (about 0.5 mm. thick × 5 cm. long) held rigidly about 1.0 mm. apart at one end were held in the flame of a gas burner until red hot. The hot wires were then quickly immersed into a homogeneous premelted and powdered mixture of 44.64 grams of reagent grade PbO and 23.19 grams of reagent grade $WO_3$ so that some of the powder stuck to the wires. The coated wire ends were then reheated in the gas flame to about 1,000°C. until the powder mixture melted and formed a droplet of liquid suspended between the two wires. Upon withdrawal from the flame, the liquid solidified to a solid bead joining the two wires. The process was repeated to obtain the desired bead size and shape.

The resistance vs. temperature characteristics of the $PbO \cdot PbWO_4$ bead thermistors were measured with standard electrical resistance measuring devices. A Pt–Pt/10 Rh thermocouple inserted into a furnace within 1–2 mm. of the bead unit was used to measure the temperature which was controlled to ± 2°C. The room temperature resistance of the $PbO \cdot PbWO_4$ bead thermistor was found to be $>10^9$ ohms but the resistance decreased continuously with increasing temperature to $8 \times 10^5$ ohms at 570°C.

EXAMPLE VI

A droplet of molten $PbO \cdot PbSO_4$ was solidified onto two gold wires and the room temperature resistance was found to be greater than $10^9$ ohms. A negative temperature coefficient of resistance was demonstrated by a decrease in resistance to about $1 \times 10^6$ ohms at 570°C.

EXAMPLE VII

Mixtures of $PbO \cdot PbCrO_4$ and $PbO \cdot PbWO_4$ in varying proportions were made into thermistor units by the bead method. The decrease in resistance with increasing temperature was demonstrated as shown in the table below. Since the resistance is a function of the $CR^{6+}/W^{6+}$ ratio, this example also demonstrates the role of the mixture of compounds in controlling electrical properties i.e., by increasing the $PbO \cdot PbWO_4$ content, the resistance increased.

| Composition (molar ratio) $PbO \cdot PbCrO_4:PbO \cdot PbWO_4$ | Resistance (ohms) 570°C. | 25°C. |
|---|---|---|
| 4:1 | $1.6 \times 10^3$ | $7 \times 10^7$ |
| 2:3 | $1 \times 10^4$ | $4 \times 10^8$ |
| 1:4 | $1.2 \times 10^5$ | $1 \times 10^9$ |

EXAMPLE VIII

Mixtures of $PbO \cdot PbCrO_4$ and $PbO \cdot PbSO_4$ in varying proportions were made into thermistor units by the bead method. The decrease in resistance with increasing temperature is demonstrated as shown in the table below. Since the resistance is a function of the $Cr^{6+}/S^{6+}$ ratio, this example also demonstrates the role of the mixture of compounds in controlling electrical properties.

| Composition (molar ratio) $PbO \cdot PbCrO_4:PbO \cdot PbSO_4$ | Resistance (ohms) 570°C. | 25°C. |
|---|---|---|
| 4:1 | $6.5 \times 10^2$ | $5 \times 10^6$ |
| 2:3 | $4.2 \times 10^3$ | $5 \times 10^7$ |
| 1:4 | $8 \times 10^4$ | $>10^9$ |

It will be appreciated that the invention is not limited to the specific details shown in the examples and illustrations and that various modifications may be made within the ordinary skill in the art without departing from the spirit and scope of the invention.

We claim:

1. A thermistor device having a negative coefficient of resistance comprising a thermally sensitive semiconductor element of a material consisting essentially of a compound having the formula:

$$PbO \cdot PbZO_4,$$

wherein Z is a member selected from the group consisting of chromium, molybdenum, tungsten, sulfur and mixtures thereof; and at least two spaced electrical conductors in electrical contact with said element.

2. The thermistor device of claim 1, wherein said material is $PbO \cdot PbCrO_4$.

3. The thermistor device of claim 1, wherein said material is $PbO \cdot PbMoO_4$.

4. The thermistor device of claim 1, wherein said material is a mixture of $PbO \cdot PbCrO_4$ and $PbO \cdot PbZ'O_4$, wherein Z' is a member selected from group consisting of molybdenum, tungsten, sulfur and mixtures thereof.

5. The thermistor device of claim 4, wherein Z' is molybdenum.

6. The thermistor device of claim 1, wherein said semiconducting element is in the form of a single crystal.

7. The thermistor device of claim 1, wherein said semiconducting element is a polycrystalline material.

8. The thermistor device of claim 1, wherein said semiconducting element is encapsulated in a protective material.

* * * * *